Sept. 24, 1940. C. DESOUTTER Re. 21,578

ELECTRIC MOTOR

Original Filed Oct. 15, 1935

Inventor
Charles Desoutter
By B. Singer, Atty.

Reissued Sept. 24, 1940

Re. 21,578

UNITED STATES PATENT OFFICE 21,578

ELECTRIC MOTOR

Charles Desoutter, London, England

Original No. 2,045,219, dated June 23, 1936, Serial No. 45,149, October 15, 1935. Application for reissue April 28, 1937, Serial No. 139,630. In Great Britain November 2, 1934

13 Claims. (Cl. 172—36)

This invention relates to efficient and readily mounted electrical switching means for the electric motors of rotary tool devices carried and applied by hand such as electric drills or the like.

In general, according to the invention, the switching means is of the type comprising a switching unit mounted in the body of the tool device, and is readily attached to or detachable from the said tool device. It has one or more contact-making or circuit-completing devices fixedly associated therewith and in connection electrically with the actual switching means proper, which may be of any suitable construction.

The motor has co-operating contacts or circuit-completing devices, which are so formed, disposed or arranged that when the switching means is attached in position, the contact-making or circuit-completing devices thereof register and make contact preferably by spring pressure with the co-operating contacts or circuit-completing devices of the motor.

Thus, according to the invention, the switching means with its contacts or the like, can be independently assembled and readily can be mounted or dismounted into or out of position.

In this manner, the necessity for soldering or otherwise making connections from the switch to the appropriate circuit or circuits of the motor can be avoided and general assembly thus facilitated; further, necessary repairs or replacements can be carried out with great expedition.

In order that the invention may be fully understood, it will now be more particularly described with reference to the accompanying drawing, wherein—

Figure 1:
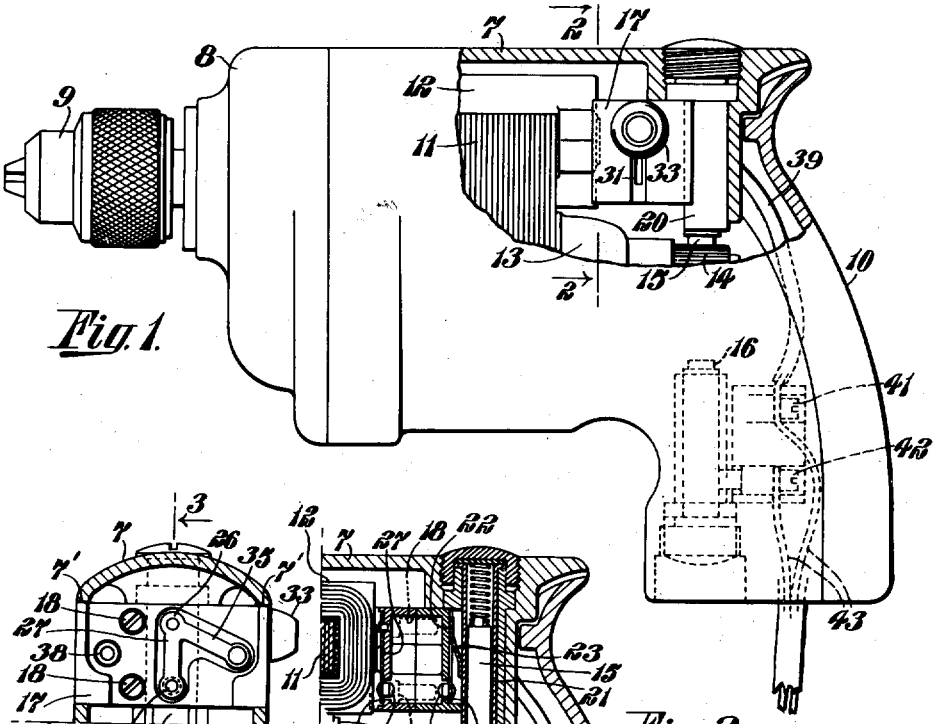
Figure 1 shows a side elevational view, partly in section, of a hand-applied portable drilling tool, supported in the manner of a pistol, which incorporates switching means constructed and arranged according to a preferred embodiment of the invention.

The particular tool device shown in the drawing comprises a main casing 7, a removable nose or front cap portion 8, which carries bearings for a tool chuck 9, and a removable rear end cover portion 10. Within the device there is accommodated a field magnet 11, field winding bobbin 12, an armature 13 together with its associated commutator 14 and commutator brushes 15 and 16, constituting a horse-shoe type motor.

Figure 2:
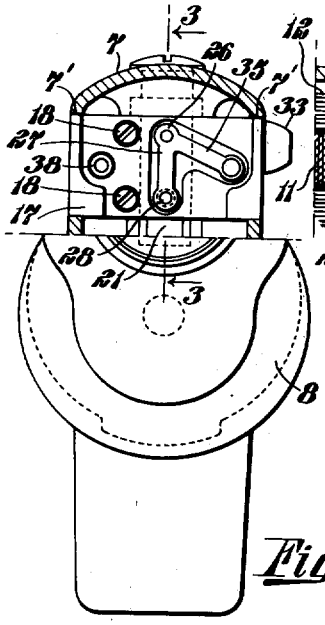
Figure 2 shows a front elevational view of Fig. 1 with the upper part in section, the section being taken substantially on the line 2—2 of Fig. 1.
Figure 3:
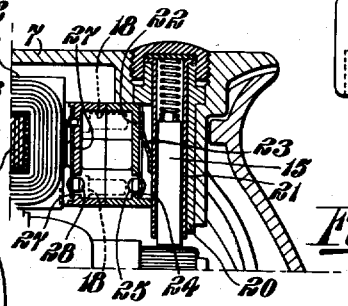
Figure 3 is a fragmentary sectional view taken on the line 3—3 of Figure 2.

Each side of the main casing 7 is provided with an aperture 7′ into which is introduced a switch box 17, constituted by two portions each formed from insulating material and adapted to be held together by means of screws indicated at 18 (Figs. 2 and 3). It will be observed that the switch box 17 extends from one side of the casing 7 to the other side and comes flush with the exterior thereof, whilst it also fits the appropriately shaped apertures 7′ and is thus held from axial or vertical movements.

To secure the switch box in position the rear portion thereof is grooved at 19 for the reception of an insulating cover 20 of the metal liner 21, provided for housing the commutator brush 15. The brush holder thus, in effect, keys the box in position within the casing and when it is in engagement with the groove 19, prevents the removal of the box.

A forward extension of the groove 19 provides accommodation for the mounting of a metallic conducting member 22, a spring limb 23 of which automatically contacts with the metallic liner 21 when the brush holder is mounted in position in the groove 19. The member 22 also includes a spring limb 24 upon which is carried a contact pin 25, which extends through the wall of the box to project slightly into the interior thereof. This pin 25 constitutes one pole of the switch device proper.

The front portion of the switch box also carries a metal conducting member, which is indicated at 26. This member includes a spring limb 27 to which a contact pin 28 is secured, the latter passing into the interior of the box at a position diametrically opposite that occupied by the pin 25 aforesaid. The pin 28 constitutes the other pole of the switch device proper.

Within the interior of the box there is accommodated manually operable means for bridging the two contact pins 25 and 28, such means being conveniently comprised by a bifurcated element 29 which is formed from metal and has its forked ends pivotally located by oppositely disposed recesses 30 provided in the interior of the box.

Figure 5:
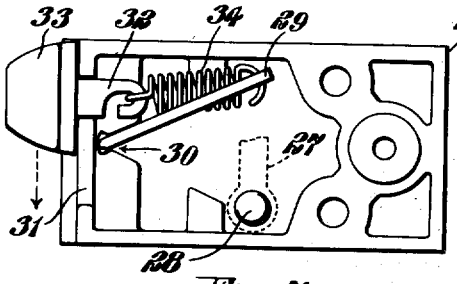
Figures 5 and 6 show in elevation the inside of one portion of the switch box shown in the preceding figures, and the outside of the other portion of said switch box respectively.
Figure 6:
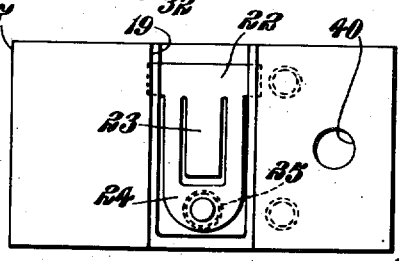

One side wall of the box is slotted as at 31 to permit the shank 32 of an operating button 33 to pass to the interior. This shank 32 is coupled with the outer end of the forked element 28 by means of a tension spring 34. It will be obvious that movement of the button 33 along the length of the slot 31 will result in a corresponding movement of the outer end of the forked element 28 about its point of pivoting, the action itself being well known. Thus, by movement of the button 33 in the direction of the arrow (Fig. 5), the side edges of the outer end of the forked element will be brought into contact with the pins 25 and 26, in which position the switch is "on," and will remain so until the button is again returned along the length of the slot 31 so as to free the forked element from the pins 25 and 26.

Figure 4:
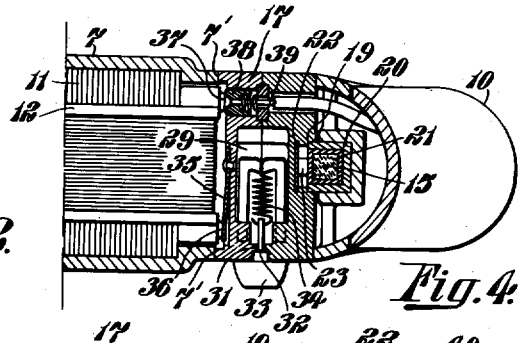
Figure 4 is a fragmentary sectional plan view of a portion of Fig. 1.

The metal conducting member 26 also includes a second spring limb shown at 35 (Figs. 2 and 4), the outer end of which is adapted automatically to make contact with a contact 36 carried by the field winding bobbin 12 when the field system is mounted in position, as described in the applicant's co-pending patent application Serial No. 45,148, filed October 15, 1935, patented June 23, 1936, Patent #2,045,218. Such automatic contact-making is also effected between a further contact 37 carried by the bobbin 12 and a spring-influenced plunger contact 38 accommodated within a housing formed in the body of the switch box, said plunger contact being directly connected with a conducting lead 39 that passes through a passage 40, and whose other end is detachably connected to a terminal 41 carried by a block indicated at dotted lines in Fig. 1.

A further terminal 42 is also mounted on the block, this latter terminal being arranged in electrical contact with the commutator brush 16.

A pair of conducting leads 43 from an electrical supply are adapted to be connected with the terminals 41 and 42.

The sequence of electrical connections and contacts of the electrical system of the device are thus as follows: terminal 41,—lead 39,—plunger contact 38,—bobbin contact 37,—field winding,—bobbin contact 36,—spring limb 35,—contact pin 28,—forked element 29,—contact pin 25,—spring limb 23,—commutator brush 15,—armature windings,—commutator brush 16,—and terminal 42.

As an alternative to the direct connection of the lead 39 with the plunger contact 38, a further plunger contact or spring limb carried by the switch box and electrically connected with the plunger 38, could be provided and adapted automatically to make contact with a contact carried by the casing of the device and to which the lead 39 is connected, when the switch box is mounted in position.

It is to be understood that in some cases spring limbs such as 35 and 23, and plunger contacts such as 38 can be replaced by divided or other pins, sockets, metal plates or otherwise as desired, to make contact by spring pressure.

Further, the electrical circuits of the motor may be as desired, and one or more of the said circuits, according to the particular arrangement, may includes the switch proper. Consequently, the said circuit or circuits of the motor is or are appropriately provided with cooperating contact or circuit-completing devices which are so formed, positioned or arranged that automatically when the switching means is located in position, the appropriate circuit or circuits automatically are completed and remain completed until the removal of the switching means.

According to a modification, in some cases the switch casing, or a part thereof, may be formed in one with the outer insulated part of the brush holder or with a portion of such brush holder where the latter is made in more than one part. By this means the electrical connection between the metallic part of the brush holder and the switch proper may be fixed, and in some cases the whole may be built up before being located in working position.

Where the switching means is more than unipolar, for example bi- or tri-polar, it will be realized that the contacts carried by the casing thereof are correspondingly increased, and in some cases the necessity for contacts not connected directly to the switch proper is obviated.

The invention is not limited to the precise forms or details of construction described, as these may be varied to suit particular cases.

What I claim and desire to secure by Letters Patent of the United States of America is:

1. A rotary tool device carried and applied by hand and incorporating an electric motor, comprising a casing, a removable switch unit mounted in a recess in said casing, contact-making circuit-completing devices on said switch unit, cooperating contacts in said casing and in resilient engagement with the aforesaid contact-making or circuit-completing devices, and means removably disposed in said casing to hold said switch unit in position therein.

2. A rotary tool device carried and applied by hand and incorporating an electric motor, comprising a casing, a removable switching unit located wholly in said casing but provided with an operating member coming to the outside of said casing, said switching unit including a housing of insulating material, a movable switch element and fixed contacts engaged by said switch element, contacts on the exterior of the housing of the switching unit, fixed contacts in said casing engaging said contacts on said switching unit resiliently, and means removably disposed in said casing to hold said switching unit in position.

3. A rotary tool device carried and applied by hand and incorporating an electric motor, comprising a casing having a transverse recess therein, a self-contained switching unit housed in said recess, said switching unit including an operating knob coming to the outside of the casing and a groove in one side face thereof, contacts on the switching unit, corresponding contacts in the casing engaging the contacts on the switching unit by spring pressure, and a member positioned radially to the motor axis and engaging said groove to prevent lateral movement of said switching unit in the casing.

4. A rotary tool device carried and applied by hand and incorporating an electric motor, comprising a casing having a transverse aperture therein, a self-contained switching unit removably mounted in said aperture, said switching unit being provided with an operating member coming to the outside of the casing and having a groove on one side face thereof, cooperating contacts on said unit and in said casing, said cooperating contacts engaging one another by spring pressure, and brush holders in said casing, one of which is adapted to engage the groove in the switching unit to hold same in position in the aperture in the casing.

5. A rotary tool device carried and applied by hand comprising a casing, an electric motor mounted in said casing, said motor including a field magnet and a commutator armature, a chuck shaft journalled in said casing, a self-contained switching unit removably mounted in a transverse bore or passage in said casing, said switching unit including a two-part casing of insulating material, a movable switch member, an operating member to the outside of the casing and fixed contacts engageable by said switch member, cooperating contacts on said switching unit and in the casing, said cooperating contacts engaging mutually by spring pressure, brush holders in said casing, one of said brush holders engaging a groove in the switching unit to hold the latter in place, and brushes mounted in said brush holders.

6. A rotary tool device carried and applied by hand, comprising a casing, a field magnet and winding in said casing, contacts associated with the field magnet winding, an armature including a commutator, a chuck shaft, means for driving said chuck shaft by said armature, a self-contained switching unit removably mounted in a transverse bore or passage in the casing, contacts on said switching unit in resilient engagement with the contacts on the field magnet winding, said switching unit being formed from a two-part housing of insulating material including a movable switching element, a slidable operating member therefor positioned to the outside of the casing, a spring between said operating member and said switching element, and fixed contacts cooperating with said switching element, brush holders one of which is adapted to engage a groove in the switching unit, a further contact on the latter engaging the said brush holder, and brushes in said holders pressed resiliently against the commutator.

7. In a portable electric tool of the character described, an outer casing, a horseshoe type motor therein, a control switch for the motor, said switch device being removably mounted in the casing adjacent the field coil of the motor, and cooperating contacts on the switch device and the coil, respectively, said contacts having surface engagement for electrically connecting the switch device and the coil when the switch device has been inserted in the casing and the parts have been positioned in operative relation.

8. In a portable electric tool of the character described, an outer casing, a horseshoe type motor therein, a control switch for the motor, said switch device being removably mounted in the casing adjacent the field coil of the motor, and cooperating contacts on the switch device and the coil, respectively, said contacts having surface engagement, one of said contacts being in the form of a strip extending in the direction of movement of the switch device into the outer casing for electrically connecting the coil and the switch device when the switch device has been inserted in the casing and the parts have been positioned in operative relation.

9. In a portable electric hand tool of the character described, an outer casing, a grip handle at the rear end of the casing and extending below the same, a horseshoe type motor located in the casing forward of the handle with the armature of the motor in the lower part of the casing and the field coil of the motor in the upper part of the casing, a control switch for the motor, said switch device being slidably mounted in the casing above the armature between the handle and the rear end of the field coil, and cooperating contacts on the switch device and the coil, respectively, for electrically connecting the switch device to the coil when the switch device has been inserted in the casing and the parts have been positioned in operative relation.

10. In a hand drill of the character described, an outer casing, an electric motor of the horseshoe type located in said casing and arranged with its armature in the lower portion of the casing and its field coil in the upper portion of the casing, a hollow handle at the rear end of the casing, upper and lower brush holders and brushes therein for the motor, the lower brush holder being located in the handle and the upper brush holder being located in the casing above the handle and in spaced relation to the field coil, a support in the casing for the upper brush holder, said coil having an electrical contact surface facing said support, and a manually operable switch device for the motor, said switch device being removably mounted in the casing between the upper brush holder support and the field coil and having yieldable contacts on its opposite sides to respectively engage the upper brush holder and the field coil contact surface when the switch device is in operative position in the casing.

11. In a hand drill of the character described, an outer casing, an electric motor of the horseshoe type located in said casing and arranged with its armature in the lower portion of the casing, and its field coil in the upper portion of the casing, a hollow handle at the rear end of the casing, upper and lower brush holders and brushes therein for the motor, the lower brush holder being located in the handle and the upper brush holder being located in the casing above the handle and in spaced relation to the field coil, a support in the casing for the upper brush holder, said coil having an electrical contact surface facing said support, and a manually operable switch device for the motor, said switch device being removably mounted in the casing between the upper brush holder support and the field coil and having contacts on its opposite sides for electrical connection with the upper brush holder and the field coil contact surface, respectively, said switch device including a casing composed of a pair of substantially mating sections, each provided with one of the switch contacts.

12. In a hand drill of the character described, an outer casing, an electric motor of the horseshoe type located in said casing and arranged with its armature in the lower portion of the casing and its field coil in the upper portion of the casing, a hollow handle at the rear end of the casing, upper and lower brush holders and brushes therein for the motor, the lower brush holder being located in the handle and the upper brush holder being located in the casing above the handle and in spaced relation to the field coil, a support in the casing for the upper brush holder, said coil having an electrical contact surface facing said support, and a manually operable switch device for the motor, said switch device being removably mounted in the casing between the upper brush holder support and the field coil and having yieldable contacts for connecting the switch device with the upper brush holder and the field coil contact surface, respectively, when the switch device is in operative position in the casing, said switch device having channels in its opposite sides for the respective switch contacts, one channel being deep enough to have the upper brush holder interfit therewith, and the other channel being shallower so that the switch contact in said channel may project beyond the same to engage the field coil contact surface.

13. In a hand drill of the character described, an outer casing, an electric motor of the horseshoe type located in said casing and arranged with its armature in the lower portion of the casing and its field coil in the upper portion of the casing, a hollow handle at the rear end of the casing, upper and lower brush holder and brushes therein for the motor, the lower brush holder being located in the handle and the upper brush holder being located in the casing above the handle and in spaced relation to the field coil, a support in the casing for the upper brush holder, said field coil having an electrical contact surface facing said support, and a manually operable switch device for the motor, said switch device being removably mounted in the casing between the upper brush holder support and the field coil and having yieldable contacts on its opposite sides to respectively engage the upper brush holder and the field coil contact surface when the switch device is in operative position in the casing, said switch device having a casing composed of a pair of separable overlapping sections, and a fastening element for securing the sections in assembled relation.

CHARLES DESOUTTER.